(12) United States Patent
Grubb et al.

(10) Patent No.: US 7,186,049 B1
(45) Date of Patent: Mar. 6, 2007

(54) PIN TO THIN PLATE JOINT AND METHOD FOR MAKING THE JOINT

(75) Inventors: Kenneth Grubb, Snyder, NY (US); Philip Wutz, Williamsville, NY (US)

(73) Assignee: Wilson Greatbatch Technologies, Inc., Clarence, NY (US)

(*) Notice: Subject to any disclaimer, the term of this patent is extended or adjusted under 35 U.S.C. 154(b) by 91 days.

(21) Appl. No.: 10/916,166

(22) Filed: Aug. 12, 2004

Related U.S. Application Data

(62) Division of application No. 10/242,096, filed on Sep. 12, 2002, now Pat. No. 6,781,088.

(51) Int. Cl.
*F16B 9/00* (2006.01)

(52) U.S. Cl. ............ 403/244; 403/240; 403/242; 403/268; 403/271; 219/121.64

(58) Field of Classification Search ........ 403/240, 403/242, 244, 268, 270, 271, 275; 219/121.63, 219/121.64
See application file for complete search history.

(56) References Cited

U.S. PATENT DOCUMENTS

| | | | |
|---|---|---|---|
| 2,018,073 A | 10/1935 | Laise | |
| 3,279,051 A | 10/1966 | Minshall | |
| 3,528,173 A | 9/1970 | Gall | |
| 3,823,464 A | 7/1974 | Charlet | |
| 4,121,044 A | 10/1978 | Hadersbeck et al. | |
| 4,185,378 A * | 1/1980 | Machida | 29/839 |
| 4,216,576 A | 8/1980 | Ammon et al. | |
| 4,326,117 A | 4/1982 | Kanne, Jr. et al. | |
| 4,551,914 A | 11/1985 | Stiggelbout | |
| 4,624,405 A | 11/1986 | Newell | |
| 4,970,624 A | 11/1990 | Arneson et al. | |
| 5,153,408 A * | 10/1992 | Handford et al. | 219/121.64 |
| 5,362,282 A | 11/1994 | Lickton | |
| 5,547,123 A | 8/1996 | Gumbert | |
| 5,802,711 A * | 9/1998 | Card et al. | 228/180.1 |
| 6,032,359 A | 8/2000 | Carroll | |
| 6,096,455 A | 8/2000 | Satake et al. | |
| 6,203,386 B1 | 3/2001 | Checchinato et al. | |
| 6,533,620 B2 * | 3/2003 | Franzen et al. | 219/121.64 |
| 6,814,584 B2 * | 11/2004 | Zaderej | 439/66 |

FOREIGN PATENT DOCUMENTS

| | | |
|---|---|---|
| FR | 2 797 206 | 2/2001 |
| JP | 2002289275 A | 10/2002 |
| SU | 1386336 A1 | 4/1988 |

* cited by examiner

*Primary Examiner*—Daniel P. Stodola
*Assistant Examiner*—Michael P. Ferguson
(74) *Attorney, Agent, or Firm*—Michael F. Scalise

(57) ABSTRACT

A pin to plate joint and method of making the joint comprising a plate comprising an entry side and an exit side with the plate defining cutouts, and the pin movable through the plate from the entry side to the exit side and in doing so pushes tab members at angles to the exit side of the plate at bends. The bends in the plate define an opening in the plate, and flow spaces are defined between the pin sidewall and the bends in the plate, with the tab members being heated to form melted tab material and flowing the melted tab material into the flow spaces and cooling, forming a pin to plate joint.

11 Claims, 7 Drawing Sheets

PIN TO THIN PLATE JOINT AND METHOD FOR MAKING THE JOINT

CROSS-REFERENCE TO RELATED APPLICATION

This application is a divisional of application Ser. No. 10/242,096, filed Sep. 12, 2002, now U.S. Pat. No. 6,781,088 to Grubb et al.

BACKGROUND OF THE INVENTION

1. Field of the Disclosure

The present disclosure relates generally to a connective structure for a pin to planar substrate.

2. Prior Art

Presently, there is high demand for goods and products, such as implantable medical devices and electronics, wherein a small diameter pin or terminal needs to be joined with a thin plate. However, joining a thin plate to a small diameter pin is a delicate art, and to date there is no quick and efficient method to create a reliable joint between the two.

For example, a past attempt to join a pin to a substrate is shown in U.S. Pat. No. 6,032,359. In this patent, a laser is employed to cut a pattern of flaps in a substrate that is made of flexible polymeric dielectric film. The pin is then inserted through the substrate flaps in the location of the cut pattern. The resilience of the flaps holds the pin therebetween by simply gripping the pin. The pin may be readily removed from between the flaps, and when done, the flaps return to their initial position. However, this reference does not show a structure that permanently joins the pin to the substrate.

An example of joining a plate and shaft is U.S. Pat. No. 5,547,123, which shows a method of securing an apparatus part in a hole defined in a base metal plate. In this patent, a circular shaft is disposed in a hole defined in a base plate, and then the two are welded together by a laser that melts adjoining material portions of the base plate and the part. However, the bond formed between the base plate and part is not of optimum strength, as the laser welding consumes a portion of the base metal surrounding the hole. In other words, the base plate has a localized zone around the weld that is thinner than the surrounding base plate, and it is in this zone that potential stress fractures may develop.

In yet other attempts to hold a pin to a substrate, the pin is pushed through the substrate and joined thereto with an adhesive. Oftentimes, these adhesives are simply unable to withstand subsequent heating of the pin and substrate assembly, thus limiting the utility of this method of joining small diameter pins with thin plates.

Thus, there is a need for a joint that connects a small diameter pin with a thin plate, along with a methodology for making the joint. There is also a need for the completed joint to be sturdy and durable, yet still made in a quick efficient process.

SUMMARY OF THE INVENTION

The present pin to thin plate joint and method for making the joint provides for a new joint and a method for making a joint between a small diameter pin (terminal) and a thin plate (substrate). A superior joint is formed that is incredibly strong, yet still of the caliber that it may be made quickly, repeatedly, and efficiently. The assembled plate and pin may then be utilized in a flexible circuit.

The thin plate itself may define a first cutout, a second cutout, a third cutout, and a fourth cutout, that are arranged on the plate in an X-shaped pattern (X-shaped cutout). The thin plate further comprises an entry side and an exit side. The pin is alignable with the X-shaped cutout, and its contact end is movable through the plate from the entry side of the plate to the exit side. As this is done, a first tab member, a second tab member, a third tab member, and a fourth tab member are raised from the plate, such that the first tab member is adjacent to the second tab member, the second tab member is adjacent to the third tab member, the third tab member is adjacent to the fourth tab member, and the fourth tab member is adjacent to the first tab member. A rectangular opening is thus defined in the plate and flow spaces are defined between the sidewall of the pin and the tabs. Further, each of the tab members is triangular-shaped and each has a tip.

After the pin passes through the plate, the raised tab members are at substantially right angles with the exit side of the plate, each tab being bent at a bend. Also, the degree to which the pin passes through the plate is variable. That is, the pin is movable through the plate such that the contact end of the pin is: positionable between the exit side of the plate and the tips of the tabs, coplanar with the tips of the tabs, or extendable a distance away from the exit side of the plate (beyond the tabs).

A means for heating is employed to join the pin to plate, which may comprises laser welding. The laser beam generated by the laser is directed on the tabs and melts the tabs. The melt flows into the flow spaces defined between the rectangular opening and the pin. Upon cooling, a joint is formed between the pin and plate that is of high strength and capable of withstanding bending and torqueing without the pin and plate separating.

Thus, the present disclosure provides for a superior joint and method for making the joint between a small diameter pin and a thin plate.

DETAILED DESCRIPTION OF THE PREFERRED EMBODIMENTS

The present invention provides a new structure and methodology for joining a thin plate 20 and a small diameter pin (pin or terminal) 70 together (FIGS. 1–3), such that a joint 150 is formed (FIG. 4), which is of superior strength, quality, and reliability.

Figure 1:
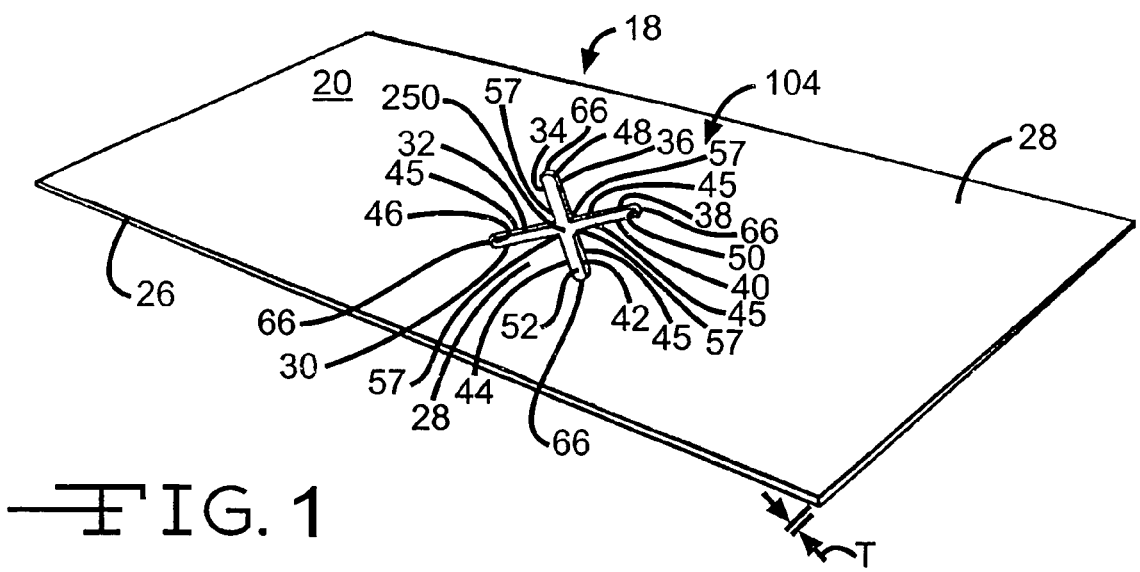
FIG. 1 is a perspective view of the plate.

Turning now to FIG. 1, shown therein is the plate 20 to which a pin (or terminal) 70 is to be joined. A unique joining of the plate 20 and pin 70 is made possible by the configuration of the plate 20. In particular, the plate 20 comprises an entry side 26 and an exit side 28, and also defines an X-shaped cutout pattern designated 104. One of the purposes of the X-shaped cutout pattern 104 is to increase the strength of the joint 150 made in a manner described presently. The pin 70 has a diameter of about 0.014–0.030 inches, and the plate 20 has a thickness (designated T in FIG. 1) of about 0.002 to 0.010 inches. These dimensions are provided for purposes of illustration and not limitation.

The plate (or substrate) 20 comprises a metal or an alloy such as nickel and titanium. The pin 70 comprises a metal or an alloy such as of molybdenum, titanium, stainless steel, and niobium. If the pin 20 and the plate 70 are of the same material, for example both made of titanium, the means for heating 99 is for heating and may comprise a laser 100 for laser welding 106 (to be described presently) or other joining techniques known to those or ordinary skill, results in actual fusion of the pin 70 and plate 20.

As seen in FIG. 1, the plate 20 comprises a first wall 30, a second wall 32, a third wall 34, a fourth wall 36, a fifth wall 38, a sixth wall 40, a seventh wall 42, and an eighth wall 44. The second wall 32 and the third wall 34 are at a substantially right angle to one another and meet at a tip 57, the fourth wall 36 and the fifth wall 38 are at a substantially right angle to one another and meet at a tip, the sixth wall 40 and the seventh wall 42 are at a substantially right angle to one another and meet at a tip 57, and the eighth wall 44 and the first wall 30 are at a substantially right angle to one another and meet at a tip 57. Respective curved end walls 66 join each pair of walls 30 and 32, 34 and 36, 38 and 40, and 42 and 44.

The plate also defines a plurality of cutouts 45. In particular, the first wall 30 and second wall 32 define a first cutout 46 therebetween. The third wall 34 and the fourth wall 36 define a second cutout 48 therebetween. The fifth wall 38 and the sixth wall 40 define a third cutout 50 therebetween. And finally, the seventh wall 42 and the eighth wall 44 define a fourth cutout 52 therebetween. The first cutout 46, second cutout 48, third cutout 50, and fourth cutout 52 are arranged such that they take on the shape of the X-shaped cutout pattern 104 in the plate, as seen in FIG. 1. The plurality of cutouts 45 radiate from a common geometrical point 250, and may be made by laser drilling, stamping, or mechanical cutting the plate 20.

Installation of the Pin

Figure 2:
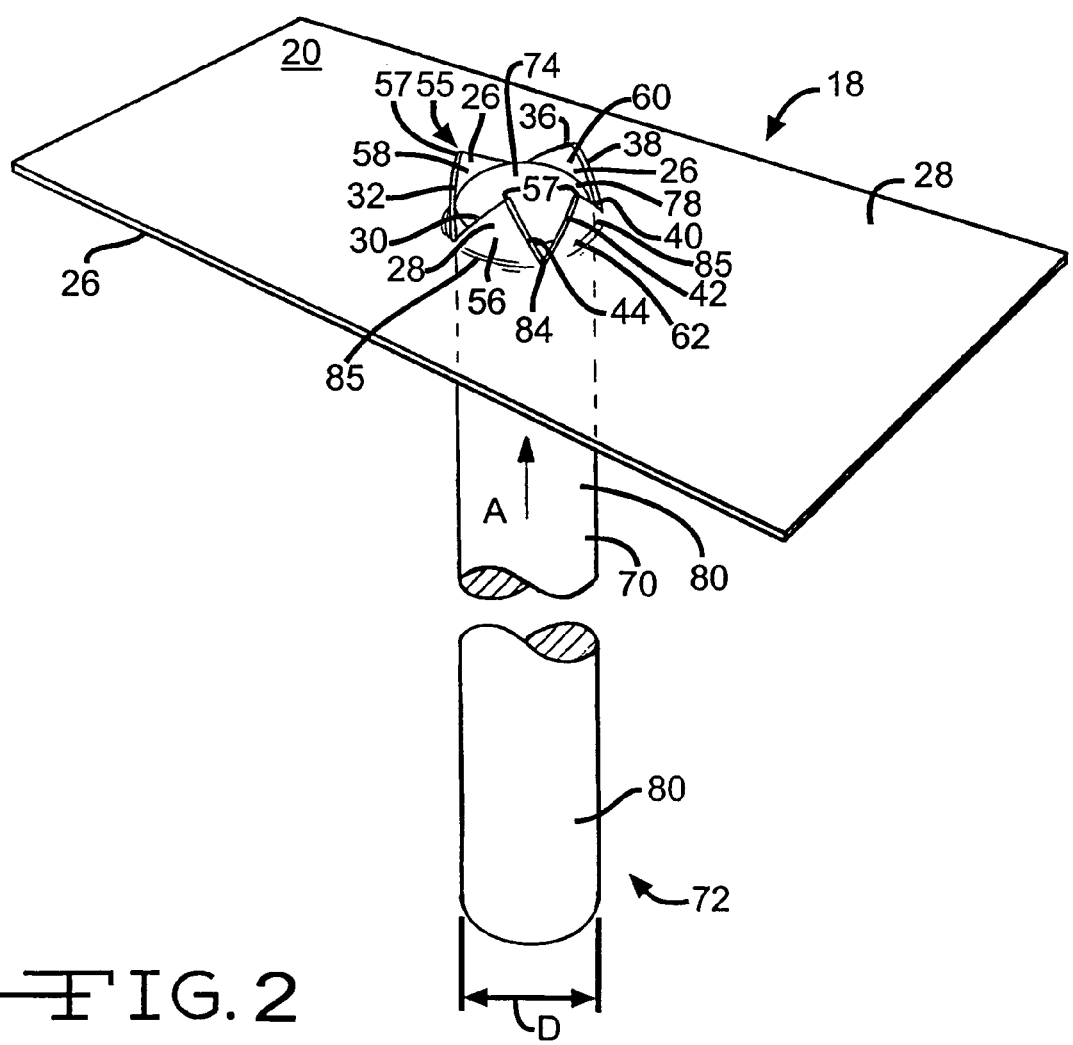
FIG. 2 is a perspective view of the plate with a pin extending therethrough.
Figure 2A:
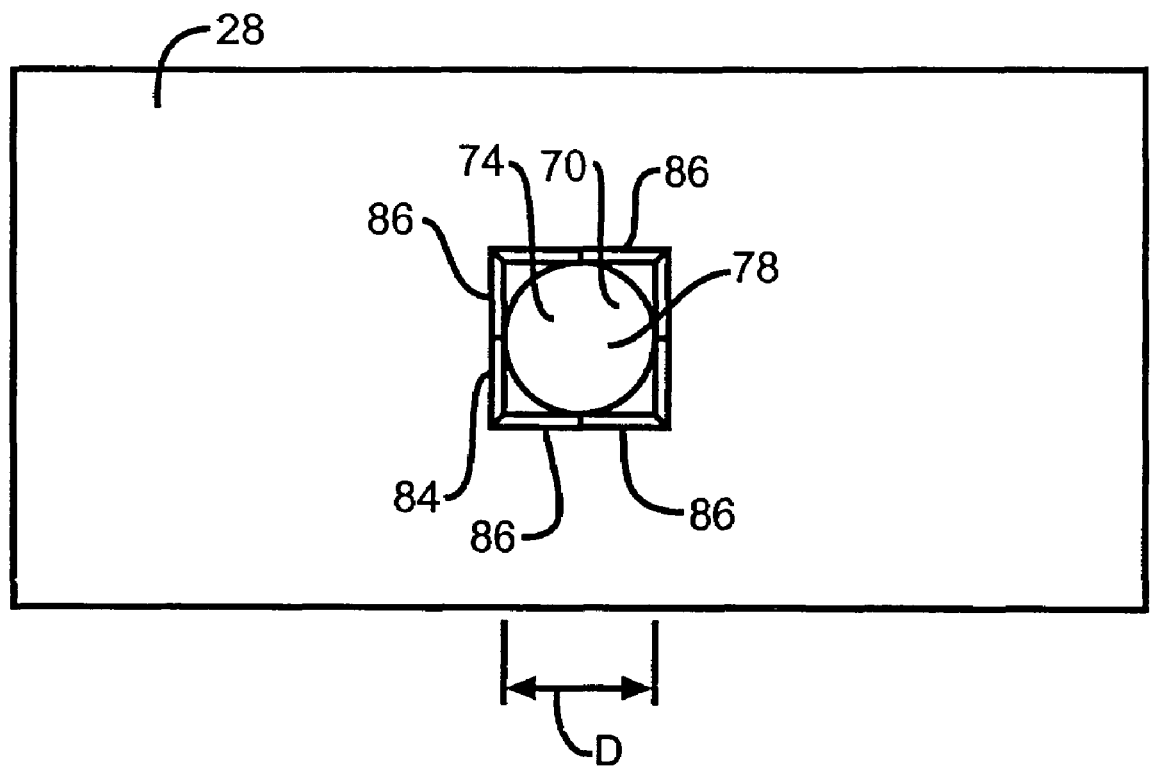
FIG. 2A is a top plan view of the pin after passing through the plate.

With the configuration of cutouts 46, 48, 50, 52 defined in the plate 20, the plate is ready to receive the pin 70. As seen in FIG. 2, the pin 70 comprises a driven end 72 that is forced upon by a driving unit (not show in the figures) which moves the pin 70 in the direction of the arrow designated A (toward the entry side 26 in the plate 20). At the end opposite the driven end 72 is the contact end 74 of the pin 70 comprising a contact surface 78. The pin 70 also has a cylindrical-sidewall 80 of a diameter designated D, as seen in FIGS. 2 and 2A.

Returning to FIG. 1, shown therein is the configuration of the plate 20 prior to contact with the pin 70. The pin 70 is aligned with the cutouts 46, 48, 50, 52 such that it is substantially perpendicular with entry side 26 of the plate 20. Then, the contact surface 78 of the pin 70 moves through the plate 20 as the pin 70 is moved in the direction of arrow A. This results in a plurality of tabs 55 (or tab members 55) pushing out from the exit side 28 of the plate 20. The plurality of tabs 55 comprise first tab member 56, a second tab member 58, a third tab member 60, and a fourth tab member 62, each being pushed to a substantially right angle with the exit side 28 of the plate 20, as seen in FIG. 2. Each of the plurality of tabs 55 are triangular-shaped and each comprise a tip 57.

Each of the raised plurality of tabs 55 is at substantially right angle with the exit side 28 of the plate 20 and extends from the plate 20 at a bend 85. A rectangular opening 84 is thus defined in the plate 20, the bends 85 being the sides of the rectangular opening 84. Additionally, a close fitting relationship is formed between the first tab member 56, second tab member 58, third tab member 60, and fourth tab member 62, and the cylindrical sidewall 80 of the pin 70. In the regions between the cylindrical sidewall 80 of the pin 20 and the bends 85 are defined flow spaces 86, which, as described presently, allow for melted tab material 64 to flow therein. FIG. 2A is a top plan view of FIG. 2 showing the flow spaces 86.

Figure 3:
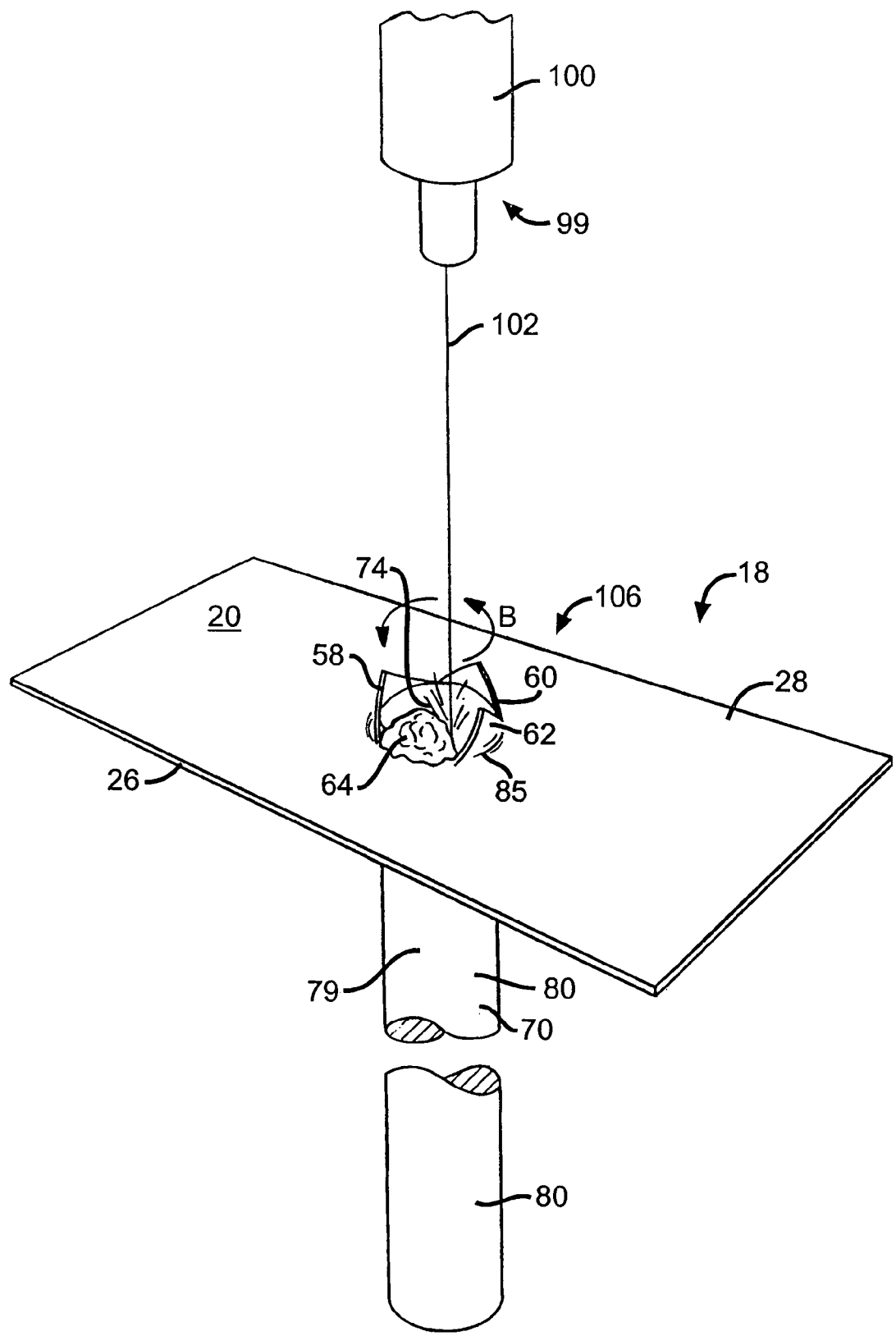
FIG. 3 is a perspective view of the laser welding of the plate to the pin.
Figure 4:
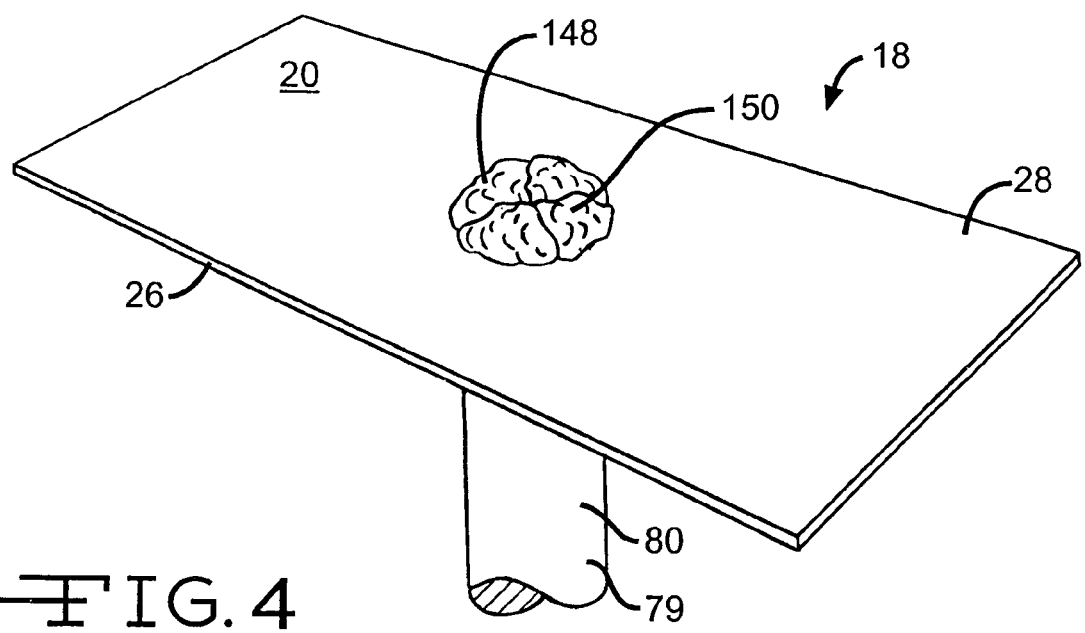
FIG. 4 shows a perspective view of the pin to plate weld joint formed by the laser welding depicted in FIG. 3.

With the pin 70 positioned in the plate 20 as described above, the pin 70 is then joined to the plate 20, as seen in FIGS. 3 and 4. The method of joining the pin 70 to the plate 20 comprises providing a laser 100 for generating a laser beam 102 to provide for laser welding 106. A first method of laser welding 106 entails using the laser beam 102 to heat the contact surface of the pin 78. In that case, the heat is transferred through the pin 70 and then to the tabs 55. In such an embodiment, the pin may be made of molybdenum and the plate may be made of nickel, so that the pin 70 is not melted at all, and only the heating melts the tabs 55, since nickel melts at a lower temperature than molybdenum. If these materials are used, the melted tab material 64 wicks over the contact surface of the pin 70 to form a cap 148 (FIG. 4). After cooling, the joint 150 formed successfully joins the plate 20 to the pin 70, and this joint 150 has high structural integrity and strength. Additionally, another advantage of the completed joint 150 is that it has a low profile with respect to the exit side 28 of the plate 20 (FIG. 4). Another advantage of this method is that the filler material used for the laser welding 106 comes from the plurality of tabs 55, so that the thin plate 20 is not consumed in the joining process. This advantageously provides for the plate 20 retaining its full structural integrity in the vicinity of the joint 150.

Additional advantages of the laser welding 106 depicted in FIG. 3 are that the use of a laser 100 allows welds to be made precisely and quickly, and only a small region of the plate 20 is subjected to high temperatures. Further, the need for fluxes is eliminated in laser welding 106.

Also, the materials comprising the pin 70 and plate 20 may be varied, or, the pin 70 and plate 20 may be of the same material. If they are of the same material, not only is the bond very strong, but also they share the same properties, for example, melting temperature, coefficient of thermal expansion, and conductivity.

Additionally, the laser 100 may be tilted with respect to the plate 20, such that the laser beam 102 strikes the plurality of tabs 55 at an angle. This arrangement is useful when the tabs 55 have a higher melting temperature than the pin 70, so that the tabs 55 melt and wick over the pin without damaging the pin 70 in the process.

Alternate Embodiments

In a first alternative embodiment, the plate 20 may define a cutout other than an X-shaped cutout pattern 104. For example, seen in FIGS. 5–8, the plate 20 comprises an entry side 26 and an exit side 28. The plate 20 defines therein a plurality of cutouts 45, and in particular a first cutout 200, a second cutout 202, and a third cutout 204. The cutouts 45 are at substantially 120-degree angle with respect to one another and are substantially the same length designated L in FIG. 5. The cutouts 45 all radiating from common geometrical point 350.

Figure 5:
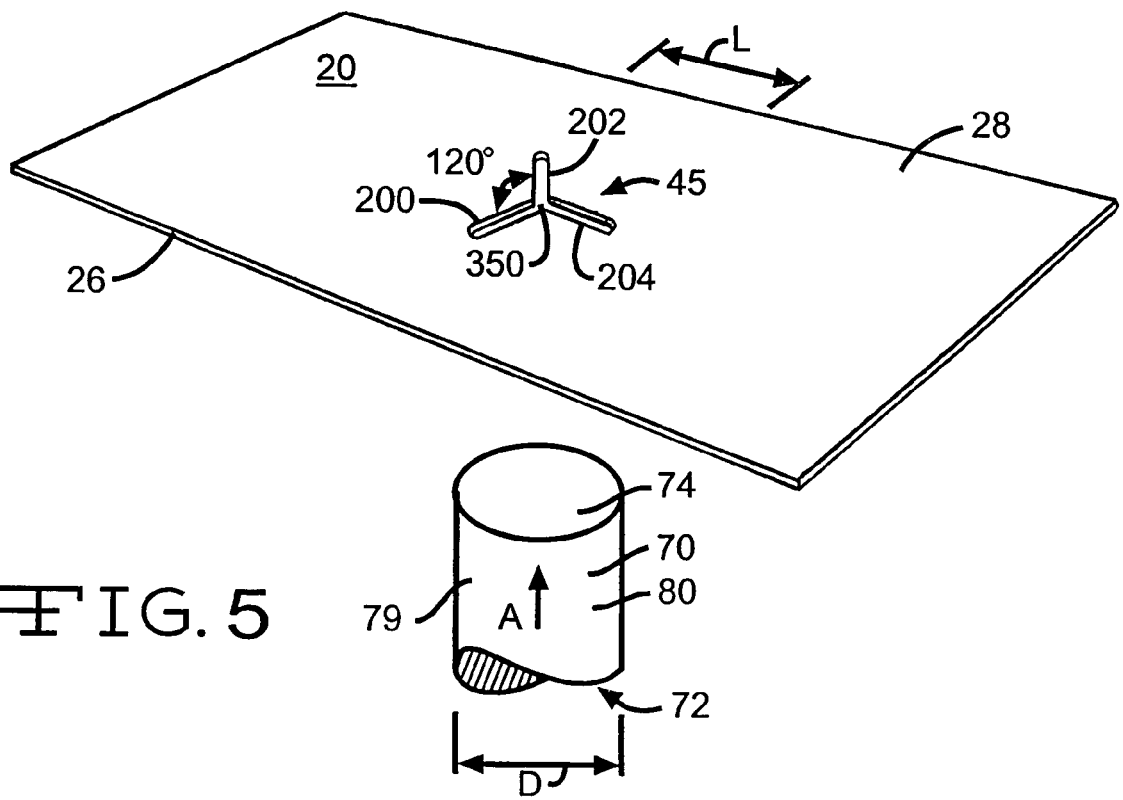
FIG. 5 is a perspective view of a first alternative embodiment wherein the plate comprises three cutouts.
Figure 6:
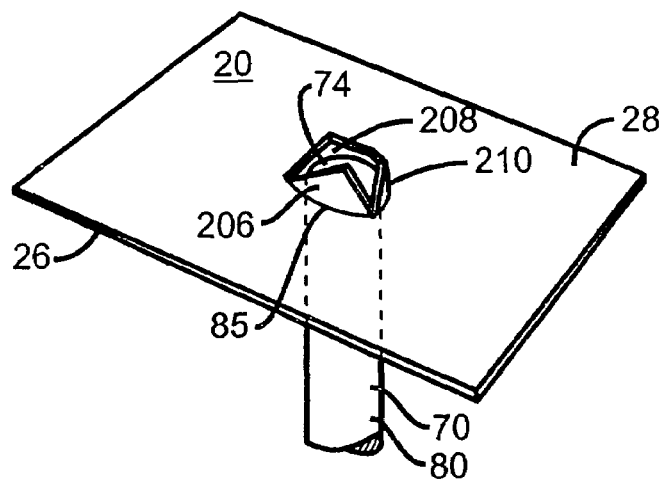
FIG. 6 is a perspective view of a first alternative embodiment as the pin moves through the plate.

The pin 70 is movable through the plate 20 from the entry side 26 to the exit side 28, in the direction of the arrow designated A, as seen in FIG. 5. As the pin 70 moves therethrough it causes a first tab 206, a second tab 208, and a third tab 210 raise from the exit side 28 of the plate 20, each along a bend 85. After the pin 70 passes through the plate 20, the first, second and third tabs 206, 208 and 210 are at a substantially a right angles to the exit side 28. Further, the first tab 206, second tab 208, and third tab 210 each come into a close fitting relationship with the cylindrical sidewall 80 of the pin 70 as the pin 70 passes through the plate 20.

Figure 7:
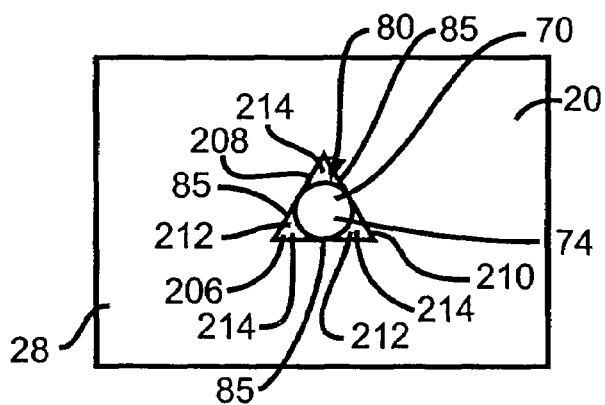
FIG. 7 is a top plan view of the first alternative embodiment.

Turning now to the top plan view in FIG. 7, shown therein is the pin 70 protruding from the plate 20. The configuration of the cutouts 200, 202, and 204 in the plate 20 results in a triangular opening 214 being formed after the pin 70 passes through the plate 20. The sides of the triangular opening 214 are the bends 85 that the first tab 206, second tab 208, and third tab 210 make with the plate 20. Also, flow spaces 214 are defined between the cylindrical sidewall 80 of the pin 70 and the bends 85.

Figure 8:
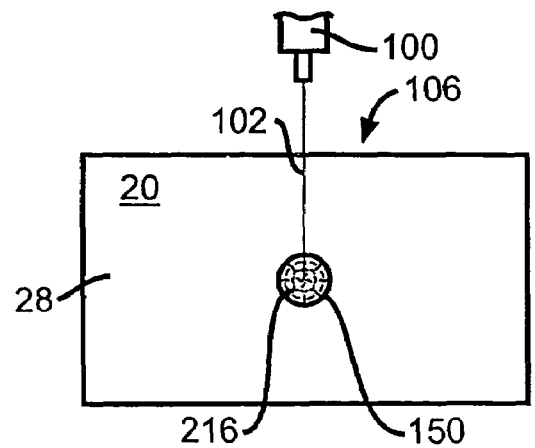
FIG. 8 is a perspective view of the first alternative embodiment showing laser welding of the pin to plate.

Laser 100 generates a laser beam 102 for laser welding 106 the first tab 206, second tab 208, and third tab 210 to the pin 70, thus joining the pin 70 to the plate 20. FIG. 8 shows the finished weld joint 150.

Figure 9:
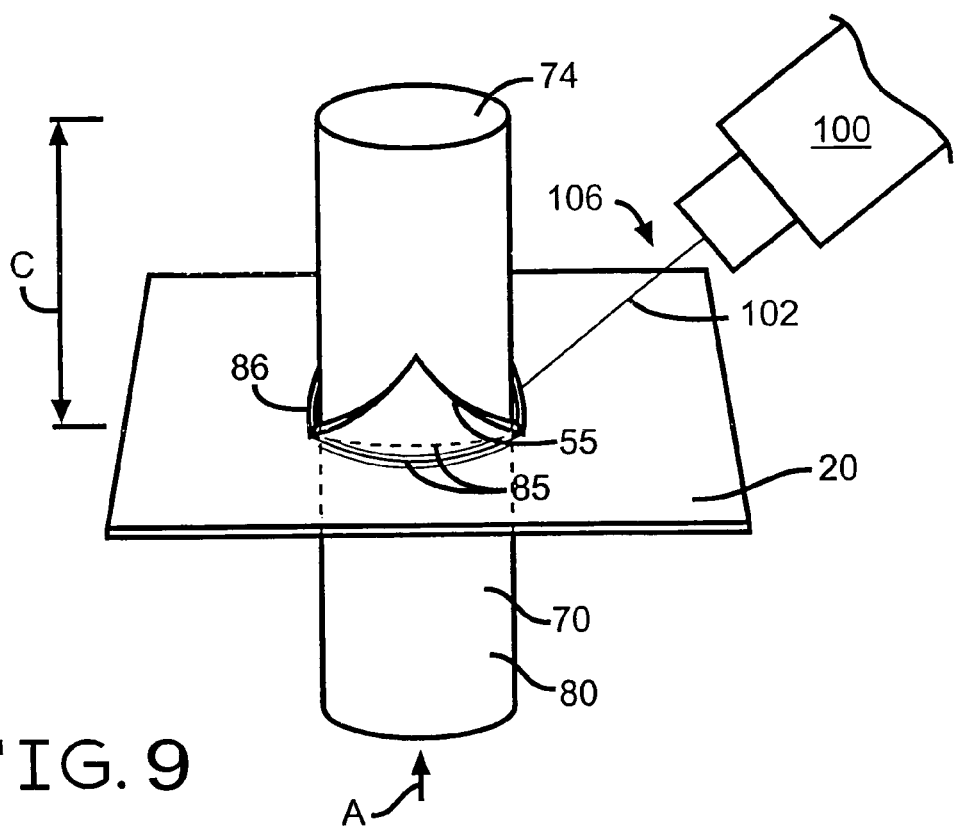
FIG. 9 is a perspective view of the laser welding of a pin to a plate in a second alternative embodiment.
Figure 10:
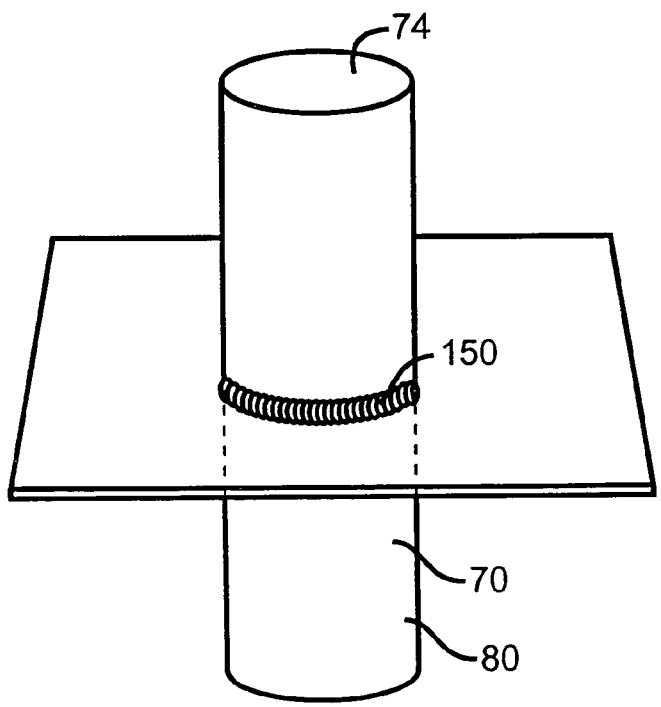
FIG. 10 is a perspective view of the completed pin to plate weld of the second alternative embodiment shown in FIG. 9.

In a second alternative embodiment, shown in FIGS. 9 and 10, the pin 70 protrudes through the plate 20 a distance designated C, such that subsequent laser welding 106 welds the cylindrical sidewall 80 of the pin 70 to the tab members 55. Here, the tabs 55 are raised at right angles to the plate 20, in a manner as previously described, with the laser beam 102 being aimed at the tabs 55. Then, the melted tab material 64 flows into the flow spaces 86 between the cylindrical sidewall 80 of the pin 70 and plate 20. After cooling, the pin 70 and plate 20 are securely joined together at joint 150, seen in FIG. 10. Again, the plate 20 and pin 70 may comprise the materials as described above.

Figure 11:
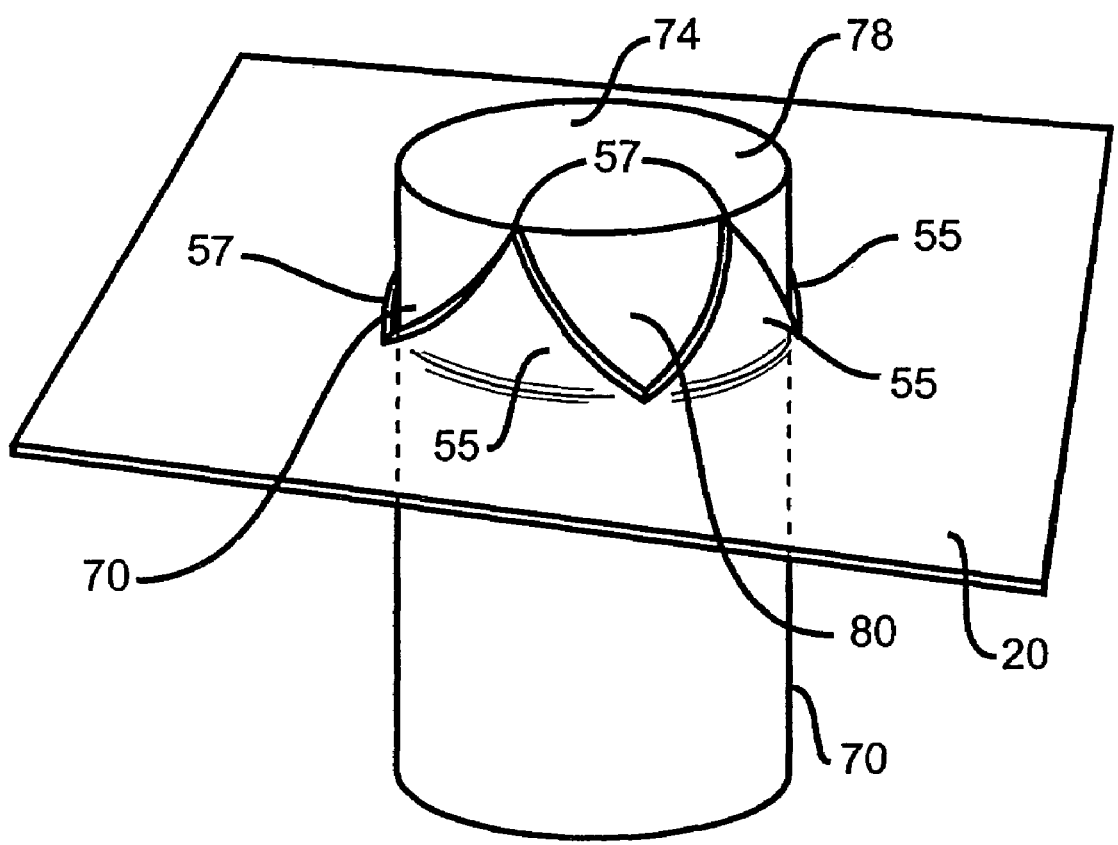
FIG. 11 is a perspective view of a third alternative embodiment of the pin and plate with the contact surface of the pin being flush with the tips of the tabs.

A third alternative embodiment is shown in FIG. 11. In FIG. 11 pin 70 is shown in a position immediately after having been passed through a plate 20 defining a plurality of cutouts that radiate from a common geometric point. As shown in FIG. 11, the tab members 55 are raised and each is at a substantially right angle to the exit side 28 of the plate 20. Here, the contact surface 78 of the pin 70 and each of the tips 57 of the tabs 55 lie in the same plane, that is, the tips 57 are flush with the contact surface 78 of the pin 70. Then the laser welding 106 is conducted in the manner previously described, such that after cooling, a robust, durable, and reliable joint 150 exists between the plate 20 and pin 70.

In other embodiments, the number of cutouts in the plate may be otherwise embodied. For example, the cutouts may number two, five, six, seven, and so forth, until the cutouts become so numerous that there is not enough tab material remaining to provide for adequate laser welding 106.

Additionally, the cutout in the plate 20 may be U-shaped resulting in a U-shaped tab when the pin 70 is moved through the plate 20. Also, the pin, in addition to comprising a circular cross section as shown in FIGS. 2, 2A, 3, 4, and 6, 9–10 may be embodied with a variety of different cross sectional profiles, for example, elliptical, U-shaped, and polygonal. In such embodiments, the cutouts in the plate 20 may be configured and arranged to allow for the passage of the alternatively shaped pin there through in a close fitting relationship.

Joint Geometry

Another of the advantages of the of the present pin 20 to plate 70 joint 150 is in the joint geometry that results after laser welding 106. For example, as the pin 70 moves though the X-shaped cutout 104 in the plate 20, as shown in FIGS. 1 to 4, the plurality of tabs 55 come into close contact with the pin 70. Simultaneously, flow spaces 86 are defined between the plate 20 and pin 70 sidewall 80. Upon laser welding 106 the flow spaces 86 fill with melted tab material 64. After cooling, a robust, strong, and durable joint 150 (FIG. 4) is formed between the pin 70 and plate 20.

Depending on the configuration and arrangement of the cutouts in the plate, differently shaped openings may be formed in the plate 20. For example, five cutouts result in a pentagonal opening being defined in the plate 20 while six cutouts result in an hexagonal opening being defined in the plate 20 when the pin 70 passes there-through. In all of these configurations, flow spaces are defined between the plate 20 and the pin 70 into which the melted tab material 64 is flowable.

It is to be understood that various changes in the details, parts, materials, steps, and arrangements, that have been detailedly described and illustrated herein in order to described the nature of the pin to thin plate joint and method for making the joint, may be made by those skilled in the art within the principles and scope of the present pin to thin plate joint and method for making the joint. While embodiments of the pin to thin plate joint and method for making the joint have been described, this is for illustration not limitation.

What is claimed is:

1. A pin-to-plate joint, which comprises:
   a) a plate comprising a thickness between a first side and a second side and a plurality of tabs, the tabs bent towards the second side at substantially right angles defining an opening in the plate with flow spaces between the bent tabs;
   b) a pin having a length extending to a proximal end and a distal end; and
   c) wherein the pin is of a higher melting temperature material than that of the plate wherein the pin is secured to the plate by a solidified cap of molten plate material wicked from the bent tabs onto the proximal pin end and into the flow spaces to thereby form the pin-to-plate joint with the distal pin end extending outwardly from the first plate side, wherein the proximal pin end has not been melted.

2. The pin-to-plate joint of claim 1 wherein the plate is selected from the group of materials consisting of: nickel and titanium; and the pin is selected from the group of materials consisting of: molybdenum, titanium, stainless steel, and niobium with the plate material being different than the pin material.

3. The pin-to-plate joint of claim 1 wherein the plate thickness is from about 0.002 inches to about 0.010 inches, and wherein the pin has a diameter of about 0.014 inches to about 0.030 inches.

4. The pin-to-plate joint of claim 1 having a profile that provides the proximal pin end being substantially flush with the first plate side.

5. The pin-to-plate joint of claim 1 wherein the solidified cap of plate material is at the second plate side.

6. The pin-to-plate joint of claim 1 wherein the proximal pin end resides in the plate thickness.

7. A pin-to-plate joint, which comprises:
a) a pin of molybdenum having a length extending to a proximal end and a distal end;
b) a plate of nickel comprising a thickness between a first side and a second side and a plurality of tabs, the tabs bent towards the second side at substantially right angles defining an opening in the plate with flow spaces between the bent tabs; and
c) wherein the molybdenum pin is secured to the plate by a solidified cap of molten nickel plate material wicked from the bent tabs onto the proximal pin end and into the flow spaces to thereby form the pin-to-plate joint with the distal pin end extending outwardly from the first plate side wherein the proximal pin end has not been melted.

8. The pin-to-plate joint of claim 7 wherein the plate thickness is from about 0.002 inches to about 0.010 inches and the pin has a diameter of about 0.014 inches to about 0.030 inches.

9. The pin-to-plate joint of claim 7 wherein the proximal pin end resides in the plate thickness.

10. A pin-to-plate joint, which comprises:
a) a plate having a thickness from about 0.002 inches to about 0.010 inches extending from a first side to a second side and a plurality of tabs, the tabs bent towards the second side at substantially right angles defining an opening in the plate with flow spaces between the bent tabs;
b) a pin having a diameter from about 0.014 inches to about 0.030 inches and a length extending to a proximal end and a distal end, wherein the proximal pin end resides in the plate thickness with the distal pin end extending outwardly from the first plate side; and
c) wherein the pin is of a higher melting temperature material than that of the plate wherein the pin is secured to the plate by a solidified cap of molten plate material wicked from the bent tabs onto the proximal pin end and into the flow spaces to thereby form the pin-to-plate joint, wherein the proximal pin end has not been melted.

11. The pin-to-plate joint of claim 10 wherein the solidified cap of plate material is at the second plate side.

* * * * *